(12) United States Patent
Chien et al.

(10) Patent No.: US 8,477,516 B2
(45) Date of Patent: Jul. 2, 2013

(54) LOW COST HIGH POWER FACTOR LED DRIVER

(75) Inventors: Min-Chu Chien, Hsinchu County (TW); Chin-Yen Lin, Hsinchu County (TW)

(73) Assignee: Noveltek Semiconductor Corp., Zhubei, Hsinchu County (TW)

( * ) Notice: Subject to any disclaimer, the term of this patent is extended or adjusted under 35 U.S.C. 154(b) by 316 days.

(21) Appl. No.: 13/088,423

(22) Filed: Apr. 18, 2011

(65) Prior Publication Data
US 2012/0262961 A1 Oct. 18, 2012

(51) Int. Cl.
*H02M 3/335* (2006.01)
(52) U.S. Cl.
USPC .................................................... 363/21.16
(58) Field of Classification Search
USPC ............... 363/20, 21.01, 21.02, 21.04, 21.07, 363/21.08, 21.1, 21.11, 21.12, 21.15, 21.16, 363/21.17, 21.18
See application file for complete search history.

(56) References Cited

U.S. PATENT DOCUMENTS

| 7,388,764 | B2* | 6/2008 | Huynh et al. | 363/21.16 |
| 7,679,936 | B2* | 3/2010 | Huynh et al. | 363/16 |
| 7,911,815 | B2* | 3/2011 | Wang et al. | 363/21.12 |
| 2010/0246216 | A1* | 9/2010 | Coulson et al. | 363/21.12 |

* cited by examiner

*Primary Examiner* — Jessica Han
*Assistant Examiner* — Afework Demisse
(74) *Attorney, Agent, or Firm* — Winston Hsu; Scott Margo

(57) ABSTRACT

A controller for a power supply having a primary side and a secondary side includes a mapping circuit for generating a feedback signal corresponding to an output current of the secondary side, a power switch coupled to the primary side for conducting a connection according to a modulation signal, a constant current block, for generating a first current signal according to the feedback signal; and a control unit, for generating the modulation signal to control the power switch according to the first current signal.

34 Claims, 8 Drawing Sheets

LOW COST HIGH POWER FACTOR LED DRIVER

BACKGROUND OF THE INVENTION

1. Field of the Invention

The present invention relates to a power supply controller and power supply using the same, and more particularly, to a power supply controller with low cost, single integrated circuit (IC) chip, and high power factor, and a power supply using the same.

2. Description of the Prior Art

Power supply is an integral part for all electronic equipments, e.g. light emitting diode (LED) lighting. An ideal power supply should include power factor correction (PFC) to ensure that current and voltage waveforms are in phase to suppress undesired harmonics, so as to enhance power efficiency.

Power supply is also required to maintain the output voltage, current or power within a regulated range for efficient and safe operation of an electronic device. Feedback paths from an output of the power supply are used to control the output of the power supply within a specific range. Also, the prior art power supply usually adopts a separation of a primary-side from a secondary-side of a transformer for safety considerations.

Please refer to FIG. 1, which is a schematic diagram of a conventional power supply 10. The power supply 10 is a fly-back topology switching power converter and includes a transformer 100, a transistor 102, a pulse width modulation (PWM) control unit 104, a feedback control unit 106, a diode 108 (as a rectifier), and a capacitor C1. The transformer 100 includes a primary winding $N_P$ and a secondary winding NS. The feedback control unit 106 includes resistors R1-R4, a capacitor C2, a photocoupler 110 and a three-terminal shunt regulator 112.

The power converting function of the power supply 10 is realized via the PWM control unit 104 by controlling the transistor 102. The PWM control unit 104 generates a corresponding control signal $V_{PWM}$ to control the transistor 102 to be turned on or off according to a feedback signal $V_F$ from the feedback control unit 106. When the transistor 102 is turned on, electrical power is stored within the primary winding $N_P$ and the diode 108 is cut off due to the inverse bias voltage and the electrical power that the load of the power supply 10 requires is provided by the capacitor C1. When the transistor 102 is cut off, the electrical power stored within the primary winding $N_P$ transfers to the secondary winding NS, the diode 108 is turned on to transfer electrical power to the load. As can be seen from FIG. 1, the feedback signal $V_F$ is generated by the photocoupler 110 driven by the three-terminal shunt regulator 112. When an output voltage $V_{OUT}$ of the power supply 10 increases or decreases, the feedback signal $V_F$ changes with the output voltage $V_{OUT}$ and thereby changes the duty cycle of the control signal $V_{PWM}$ for adjusting electrical power outputted to the load to keep the output voltage $V_{OUT}$ stable. The three-terminal shunt regulator 112 needs peripherals including the resistors R1, R2, R3 and the capacitor C2 to complete the function. The resistors R1 and R2 are used for dividing the output voltage $V_{OUT}$ to generate the reference voltage of the three-terminal shunt regulator 112. The resistor R3 and the capacitor C2 are used for providing the loop comparison needed by the three-terminal shunt regulator 112.

However, such a secondary side feedback control mechanism increases circuit size and power dissipation, and utilizes the linear voltage regulator and the photocoupler to separate the primary-side from the secondary-side, which are both costly components. Furthermore, in order to cooperate with high power output applications, the whole driving circuit must use two independent controller ICs (integrated circuit), i.e., the PFC controller and the PWM controller. Thus, circuit designs not only become more complicated, but also more expensive.

SUMMARY OF THE INVENTION

Therefore, the primary objective of the present invention is to provide a low cost, single integrated circuit (IC) chip, and high power factor power supply converter.

The present invention discloses a controller for a power supply having a primary side and a secondary side, the controller including a mapping circuit, coupled to the primary side, for generating a feedback signal corresponding to variations of an output current of the secondary side; a power switch, comprising a first terminal coupled to the primary side, a second terminal and a third terminal, for conducting a connection between the first terminal and the third terminal according to a modulation signal received by the second terminal, and generating a current sense signal at the third terminal; a constant current block, for generating a first current signal according to the feedback signal and the current sense signal; and a control unit, for generating the modulation signal to control the power switch according to the first current signal, the feedback signal, the current sense signal and a voltage signal from the power supply.

The present invention further discloses a power supply including a transformer, including a primary side winding for providing a primary side current; and a secondary side winding for providing a secondary side current for the output current, wherein a ratio between the secondary current and the primary current is a constant; and a controller for the power supply, including a mapping circuit, coupled to the primary side, for generating a feedback signal corresponding to variations of an output current of the secondary side; a power switch, comprising a first terminal coupled to the primary side, a second terminal and a third terminal, for conducting a connection between the first terminal and the third terminal according to a modulation signal received by the second terminal, and generating a current sense signal at the third terminal; a constant current block, for generating a first current signal according to the feedback signal and the current sense signal; and a control unit, for generating the modulation signal to control the power switch according to the first current signal, the feedback signal, the current sense signal and a voltage signal from the power supply.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
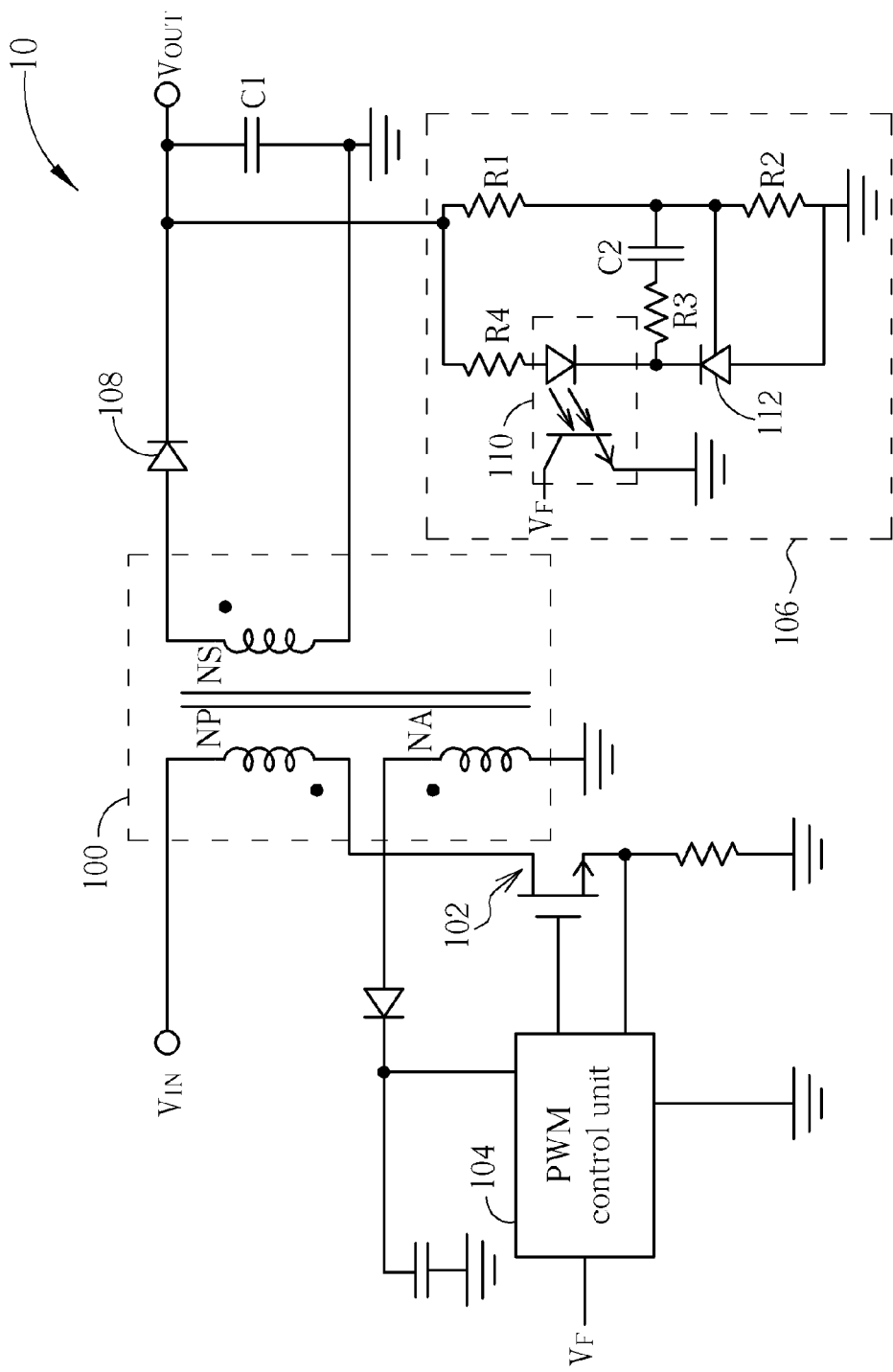
FIG. 1 is a schematic diagram of a power supply according to the prior art.
Figure 2:
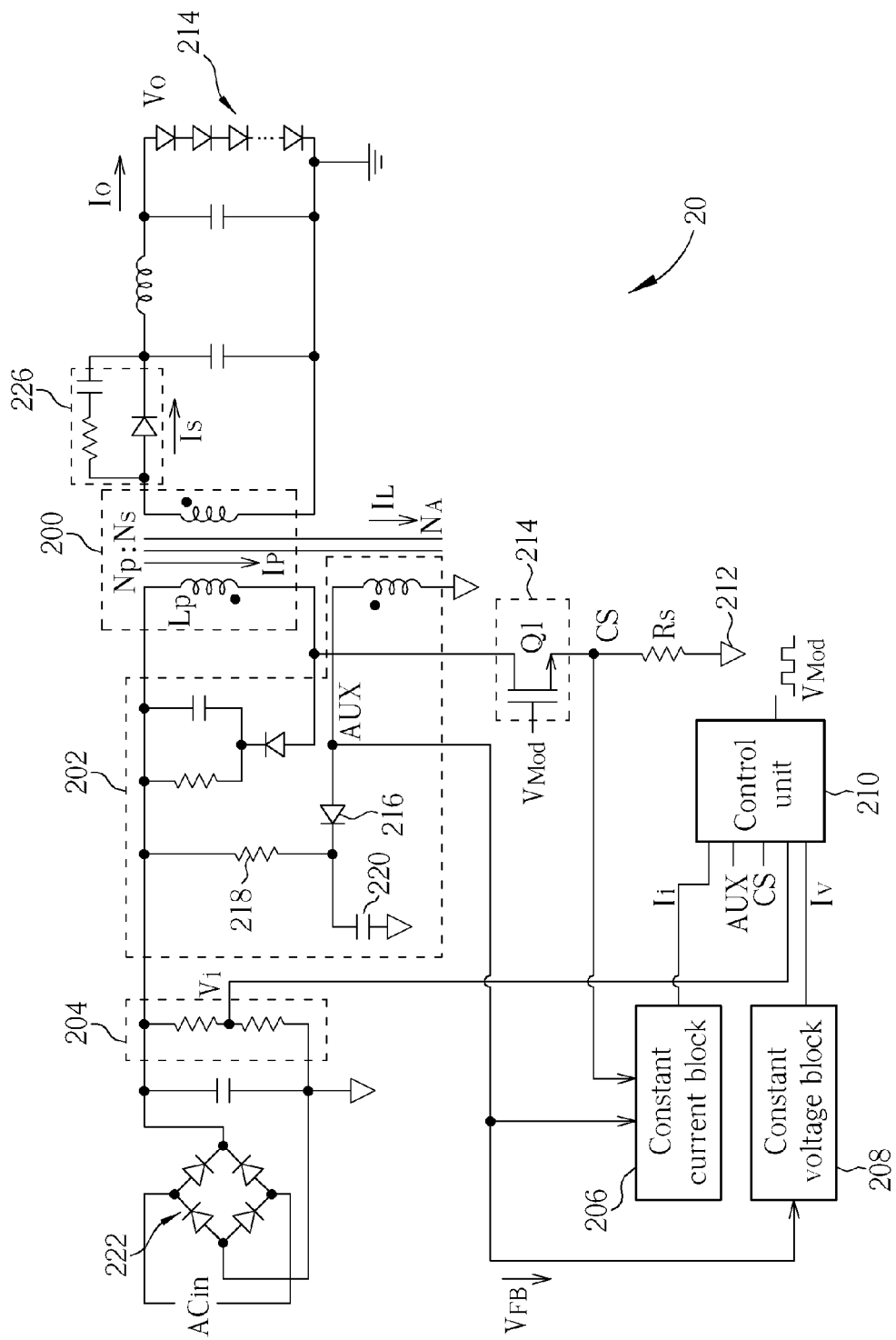
FIG. 2 is a schematic diagram of a power supply according to an embodiment of the present invention.

Please refer to FIG. 2, which is a schematic diagram of a power supply 20 according to an embodiment of the present invention. The power supply 20 is utilized for providing an output voltage $V_o$ and an output current $I_o$ for a load 214, such as a plurality of light emitting diodes (LED). The power supply 20 includes a transformer 200, a mapping circuit 202, a power switch Q1, a constant current block 206, a constant voltage block 208, a control unit 210, and a current sensing resistor $R_S$. An alternating current (AC) input voltage ACin is rectified by a bridge rectification circuit 222 to generate a primary-side voltage signal $V_i$ through a voltage divider 224. The transformer 200 has a primary winding $N_P$ and a secondary winding $N_S$ for providing a primary side current $I_P$ and a secondary side current $I_S$, respectively. A ratio between the secondary side current $I_S$ and the primary side current $I_P$ is a constant. The mapping circuit 202 is utilized for generating a feedback signal $V_{FB}$ from a feedback node AUX in response to variations of the output current $I_o$. The mapping circuit 202 includes an auxiliary winding $N_A$ inductively coupled to the primary winding $N_P$ and the secondary winding $N_S$ such that an inductor current $I_L$ in the auxiliary winding $N_A$ maps any variation in the secondary side current of the secondary winding $N_S$. As such, the feedback signal $V_{FB}$ derived from the node AUX of the mapping circuit 202 corresponds to variations of the output current $I_o$. Since the mapping circuit 202 is a part of the primary side of the power supply 20, such feedback mechanism is known as primary side feedback control. An advantage of the primary feedback control over secondary feedback control is a reduction in costs due to elimination of costly components such as photocouplers.

The power switch Q1 is utilized to conduct or turn off the primary side current $I_P$ flowing through the primary winding $N_P$ according to a received modulation signal $V_{Mod}$. When the power switch Q1 is turned off, the primary side current $I_P$ consumes to zero and electrical power is transferred to the secondary side. When the power switch Q1 is turned on, the primary side current $I_P$ flows through the current sensing resistor $R_S$, generating a current sense signal CS corresponding to the primary side current $I_P$. Preferably, the power switch Q1 may be an N-type metal oxide semiconductor field effect transistor (N-type MOSFET) with a drain terminal coupled to the primary winding $N_P$ of the transformer 200, i.e. the primary side of the power supply 20, a gate terminal coupled to the control unit 210 to receive the modulation signal $V_{Mod}$, and a source terminal coupled to the current sensing resistor $R_S$ to generate the current sense signal CS.

Therefore, by controlling the power switch Q1 to conduct or to turn off, it is possible to control the power transferred from the primary side of the power supply 20 to the secondary side, in turn controlling the output power. The modulation signal $V_{Mod}$ is preferably a pulse width modulation (PWM) signal for turning on/off the power switch Q1, thereby regulating the output current $I_o$. Any other signal capable of controlling an on/off status of the power switch Q1 is included within the scope of the present invention. Specifically, the control unit 210 determines the power delivered from the primary winding $N_P$ to the second winding $N_S$ of the transformer 200 and regulates the output current $I_o$ by adjusting a duty cycle of the modulation signal $V_{Mod}$.

When the modulation signal $V_{PWM}$ transforms from a low voltage level to a high voltage level, the power switch Q1 is turned on and the primary side current $I_P$ passing through the primary winding $N_P$ and the current sensing resistor $R_S$ increases. The current sensing resistor $R_S$ senses the primary side current $I_P$, thereby generating the current sense signal CS to the constant current block 206. The electrical power generated by the input voltage ACin is stored in the primary winding $N_P$, and a rectifier 226 of the secondary-side and a diode 216 of the mapping circuit 202 are cut off due to reverse bias voltage and thus the current $I_S$ passing through the secondary winding $N_S$ is zero. When the power switch Q1 is turned off by the modulation signal $V_{Mod}$, the energy stored in the primary winding $N_P$ of the transformer 200 is delivered to the secondary winding $N_S$, causing the secondary side current $I_S$ and the inductor current $I_L$ of the auxiliary winding $N_A$, which follows $I_S$, to increase.

Figure 3:
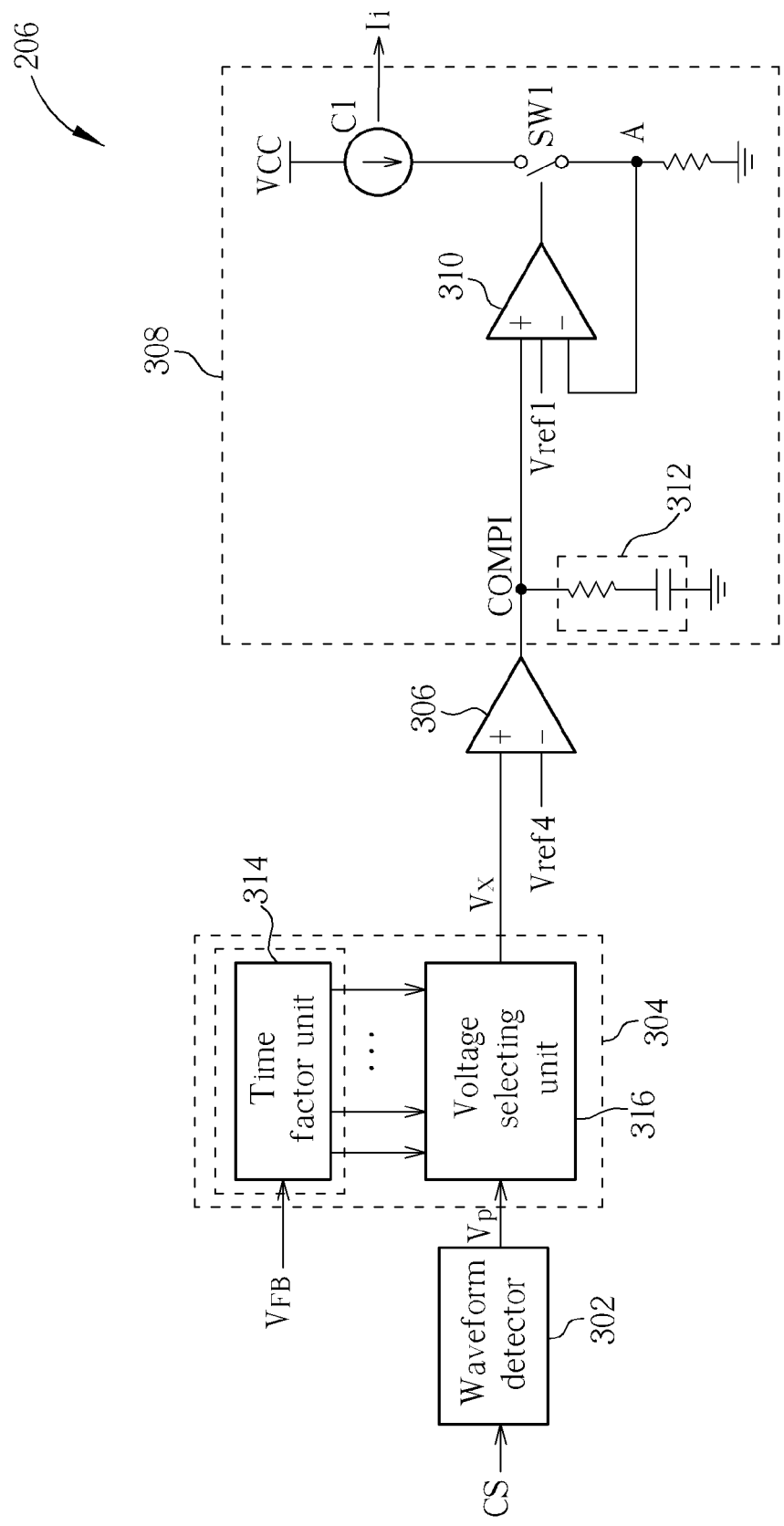
FIG. 3 is a schematic diagram of a constant current block for the power supply shown in FIG. 2 according to an embodiment of the present invention.

Please refer to FIG. 3, which is a schematic diagram of the constant current block 206 in FIG. 2 according to an embodiment of the present invention. The constant current block 206 includes a waveform detection unit 302, a calculation unit 304, an error amplifier 306 and a comparator unit 308. The waveform detection unit 302 is coupled to the current sensing resistor $R_S$ and used for detecting a waveform of the current sense signal CS and generating a captured signal $V_P$. The waveform detection unit 302 obtains the waveform of the current sense signal CS by detecting the primary side current $I_P$ on the current sensing resistor $R_S$.

The calculation unit 304 is coupled to the waveform detection unit 302 and used for generating a selected voltage $V_X$, which is a voltage divided result of the captured signal $V_P$. The calculation unit 304 is used for detecting a discharge time $T_{dis}$ of the feedback signal $V_{FB}$, corresponding to a discharge time in which the secondary side current $I_S$ consumes to zero in the secondary winding $N_S$, and a period T of the feedback signal $V_{FB}$ and generating a time factor Tf. The time factor Tf can be represented by $[(T_{dis}/T)*K]$, wherein K is a constant. The calculation unit 304 generates the selected voltage $V_X$ according to the time factor Tf and the captured signal $V_P$. The selected voltage $V_X$ is a voltage divided result of the captured signal, and may be denoted $$V_X = V_P * \frac{T_{dis}}{T} * K.$$

Preferably, the calculation unit 304 could be a digital-to-analog converter.

It can also be shown that the selected voltage $V_X$ is positively proportional to the output current $I_o$ of the power supply 20. As shown in U.S. application Ser. No. 12/901,578 (with the same applicant and inventors of the present invention), the selected voltage $V_X$ can be denoted as:

$$V_X = R_S * \frac{N_S}{N_P} * I_O * K$$

In other words, the constant current block 206 obtains the selected voltage $V_X$ positively proportional to the output current $I_o$ according to the waveform detection unit 302 and the calculation unit 304. In short, the output current $I_o$ is controlled by the selected voltage $V_X$.

The error amplifier 306 has one input terminal coupled to the selected voltage $V_X$ and the other terminal coupled to a reference voltage $V_{ref4}$. The error amplifier 306 limits a maximum value of the selected voltage $V_X$ to the fourth reference voltage $V_{ref4}$. Consequently, a maximum output current $I_{oMAX}$ is clamped to a constant current related to the fourth reference voltage $V_{ref4}$. It can be shown that $I_{oMAX}$ can be denoted as $$\frac{V_{ref4}}{K*R_S} * \frac{N_P}{N_S}$$

according to U.S. application Ser. No. 12/901,578. As a result, if the output voltage $V_o$ of the power supply 20 is over a tolerable voltage, the output current $I_o$ can be limited to the constant value to avoid damaging the power supply 20. In addition, the output current $I_o$ of a constant value can be applied to related constant current elements, such as light-emitting diode (LED) lighting.

The comparator unit 308 is utilized for comparing a first comparison signal COMPI outputted by the error amplifier 306 with a first reference voltage $V_{ref1}$ and generating the first current signal $I_i$ to the control unit 210. A voltage storage unit 312 stores the first comparison signal COMPI outputted by the error amplifier 306. A comparator 310 is utilized to conduct or turn off a first switch SW1, to generate the first current signal $I_i$. The comparator has a first positive input terminal coupled to the first comparison signal COMPI, a second positive input terminal coupled to the first reference voltage $V_{ref1}$ and a negative input terminal coupled to a first node A. When a voltage at either of the two positive input terminals is greater than that of the negative input terminal, i.e. when either the first comparison signal COMPI or the first reference voltage $V_{ref1}$ is higher than a voltage at the node A, the comparator 310 outputs a high level voltage to conduct the first switch SW1. When the first switch SW1 is turned on, a current source C1 outputs the first current signal $I_i$ to the control unit 210. A resistor as a load is coupled between the node A and a grounding terminal, and when the current from the current source C1 flows through the load, a voltage at the node A rises. When the voltage at the node A and the negative input terminal of the comparator 310 is higher than that of the two positive input terminals, the comparator 310 outputs a low voltage level to turn off the first switch SW1. The first switch SW1 is a three terminal component and may preferably be an N-type MOSFET, with a drain terminal coupled to the current source C1, a gate terminal coupled to the comparator 310 and a source terminal coupled to the node A.

As to implementation of the calculation unit 304, those skilled in the art can further refer to U.S. application Ser. No. 12/901,578 (with the same applicant and inventors of the present invention) to use a counter and multiple switches. Consequently, the constant block 206 can be implemented without any complicated circuits or expensive components (e.g. integrator), further reducing production costs of the power supply 20.

Figure 4:
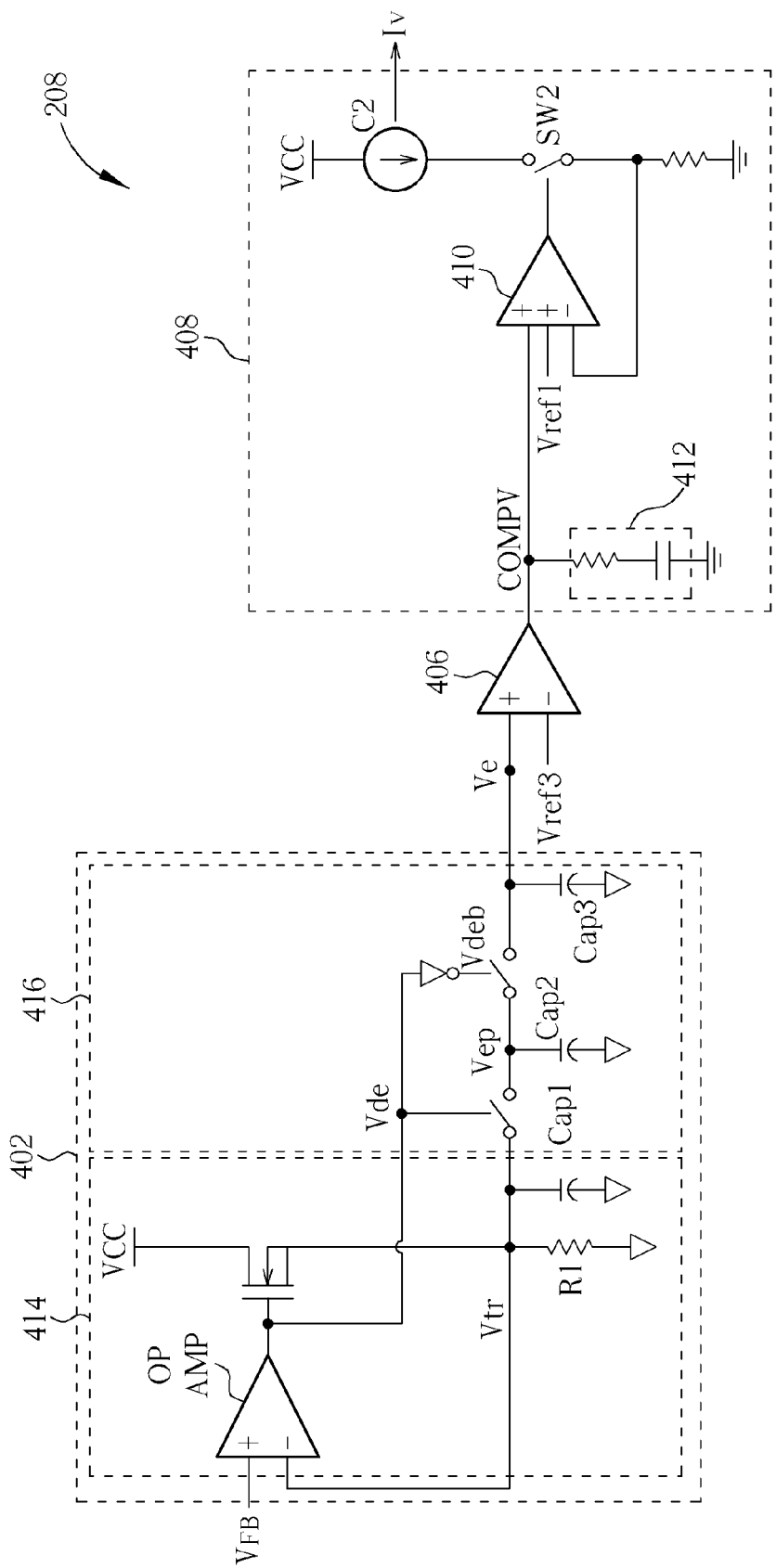
FIG. 4 is a schematic diagram of a constant voltage block.

The constant voltage block 208 is optionally included in the power supply 20, for providing circuit over-voltage protection. Those skilled in the art can further refer to U.S. application Ser. No. 12/883,195 (with the same applicant and inventors of the present invention) for implementation of the constant voltage block 208. Please refer to FIG. 4, which is a schematic diagram of the constant voltage block 208. The constant voltage block 208 generates a second current signal according to a knee voltage (i.e. the voltage on the auxiliary winding $N_A$ when current $I_S$ passing through the secondary winding $N_S$ decreases to zero) of the feedback signal $V_{FB}$, and includes a peak detector 402, for generating a peak voltage signal $V_e$ according to a knee voltage of the feedback signal $V_{FB}$. The peak detector 402 includes a voltage tracking unit 414, for tracking the feedback signal $V_{FB}$ and outputting a first voltage signal $V_{tr}$ and outputting a first control signal $V_{de}$, and a sample-and-hold unit 416 coupled to the voltage tracking unit 414, for sampling the first voltage signal $V_{tr}$ to generate the peak voltage signal.

In short, when current passing through the secondary winding $N_S$ decreases to zero, the knee voltage of the feedback signal $V_{FB}$ occurs and is tracked by the voltage tracking unit 414 accordingly. The sample-and-hold unit 416 samples the knee voltage of the voltage tracking unit 414 and generates a peak voltage signal $V_e$, and the constant voltage block generates a corresponding second current signal $I_v$ for the control unit 210 to generate the modulation signal $V_{Mod}$ for controlling the power switch to be turned on or cut off, so as to control the electrical power transformation of the power supply 20. Therefore, when the load of the power supply 20 changes and causes the change of the output voltage $V_o$, e.g. when an LED of the load 214 burns out or shorts, the knee voltage of the feedback signal $V_{FB}$ changes accordingly, the peak detector 402 generates the peak voltage signal $V_e$ corresponding to the knee voltage of the feedback signal $V_{FB}$ and thereby the control unit 210 generates the modulation signal $V_{Mod}$ with appropriate duty cycle according to the feedback signal $V_{FB}$. The control signal $V_{Mod}$ is used for controlling the transistor 204 for adjusting the electrical power transferred to the secondary side to supply different loads. Operations of the error amplifier 406 and the comparator unit 408 are similar to that of the constant current block 206, and are not reiterated here.

Figure 5:
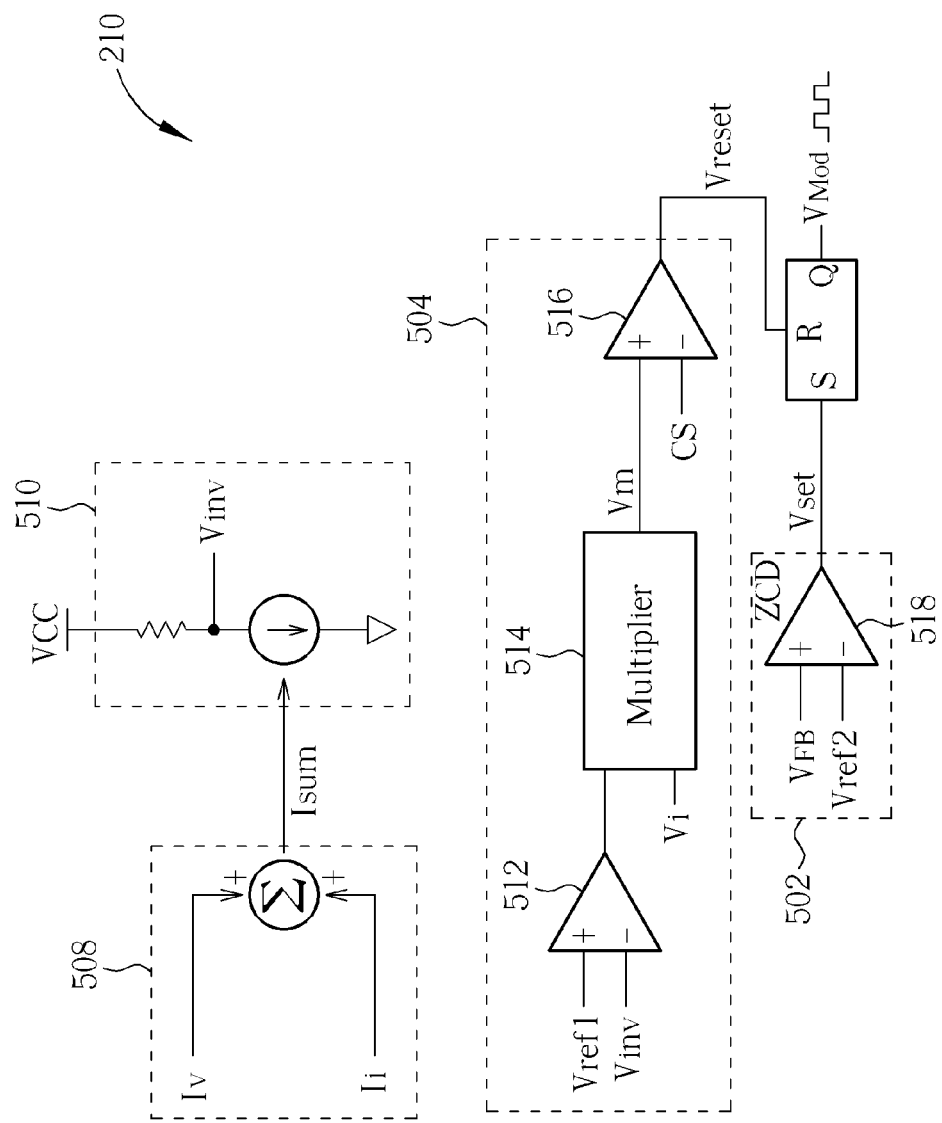
FIG. 5 is a schematic diagram of a control unit for the power supply shown in FIG. 2 according to an embodiment of the present invention.

Please refer to FIG. 5, which is a schematic diagram of the control unit 210 for the power supply 20 in FIG. 2 according to an embodiment of the present invention. The control unit 210 includes a setting unit 502, for generating a set signal $V_{set}$, a resetting unit 504, for generating a reset signal $V_{reset}$, and a set/reset (SR) flip-flop 506, for generating the modulating signal $V_{Mod}$ according to the set signal $V_{set}$ and the reset signal $V_{reset}$.

The setting unit 502 includes a zero current detector 518, for detecting a zero current in the feedback signal $V_{FB}$ and generating the set signal $V_{set}$. Specifically, when an inductor current $I_L$ of the auxiliary winding $N_A$ decays to zero, the zero current detector 518 detects a zero current and outputs the $V_{set}$ signal to the SR flip-flop 506, which in turn sets the modulation signal $V_{Mod}$ to a high voltage level "1" to conduct the power switch Q1.

The resetting unit 504 includes a current summing unit 508, an input voltage unit 510, an error amplifier 512, a multiplier 514, and a comparator 516. The current summing unit 508 sums the first current signal $I_i$ and a second current signal $I_v$ from the constant current block 206 and the constant voltage block 208, respectively, and generates a current sum $I_{sum}$. The input voltage unit 510 generates an inverted voltage signal $V_{inv}$ according to the current sum $I_{sum}$. The error amplifier 512 limits the inverted voltage signal $V_{inv}$ to a first reference voltage $V_{ref1}$ and generates a comparison signal COMP. The multiplier 514 multiplies the comparison signal COMP with the voltage signal $V_i$ from the power supply and generates a voltage product $V_m$. The comparator 516 compares the voltage product $V_m$ with the current sense signal CS and generates the reset signal $V_{reset}$. Specifically, once the power switch Q1 is turned on, the primary side current $I_P$ increases, causing a voltage of the current sense resistor $R_s$ at the source terminal of the power switch Q1 to rise. The error amplifier 512 compares a reference voltage $V_{ref1}$ with the inverted voltage signal $V_{inv}$, which corresponds to the current sum $I_{sum}$ of the first current signal $I_i$ from the constant current block 206 and the second current signal $I_v$ from the constant voltage block 208, and generates the comparison signal COMP. Next, the multiplier 514 multiplies the comparison signal COMP with the voltage divided voltage signal $V_i$ from the primary side corresponding to a rectified DC input voltage of the power supply 20. The multiplier 514 generates a voltage product $V_m$, which is then compared with the current sense signal CS by the comparator 516. If the current signal CS is greater than the voltage product $V_m$, the comparator 516 outputs the reset signal $V_{reset}$ to the SR flip-flop 506, to produce a low voltage level in the modulation signal $V_{Mod}$, which in turn turns off the power switch Q1. FIG. 6B is a schematic diagram of the comparison of the voltage product $V_m$ and the current sense signal to generate the modulation signal $V_{Mod}$.

Figure 6A:
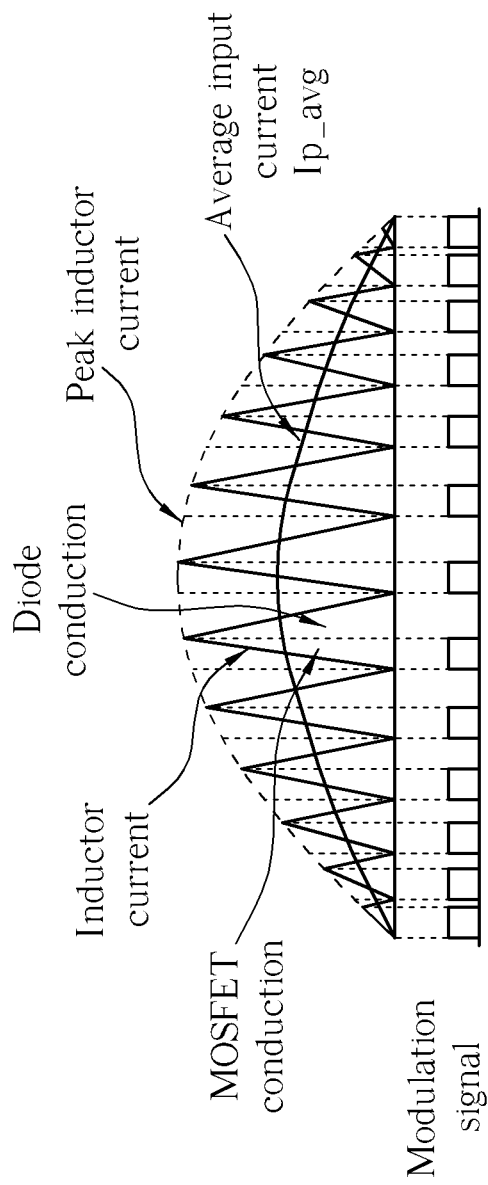
FIGS. 6A and 6B are schematic diagrams of waveforms of the power supply shown in FIG. 2.
Figure 6B:
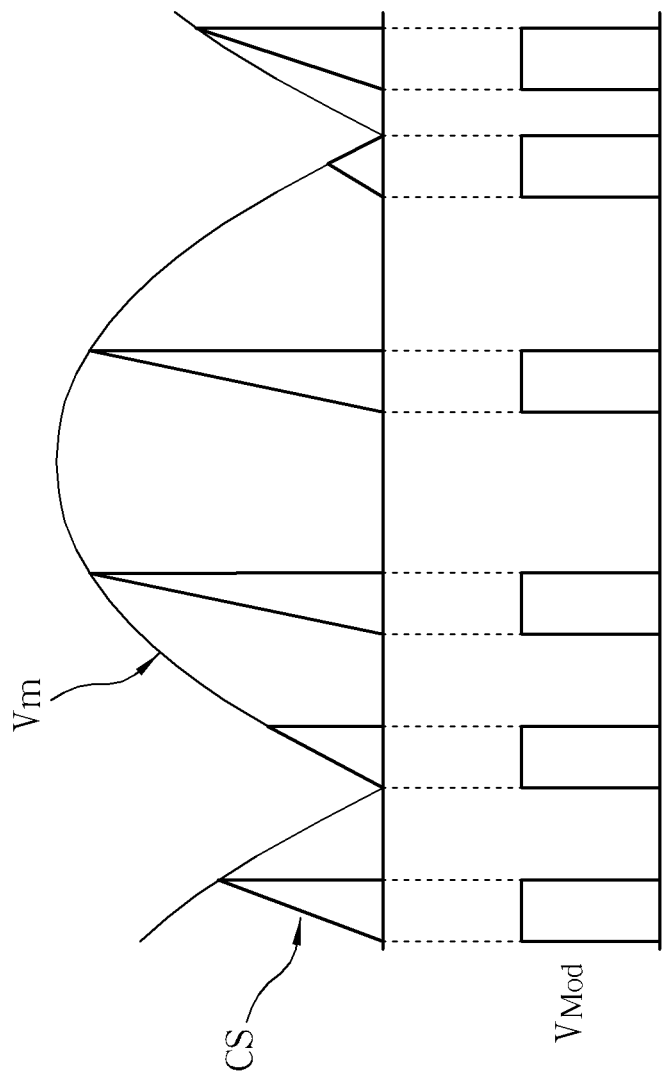
Figure 7:
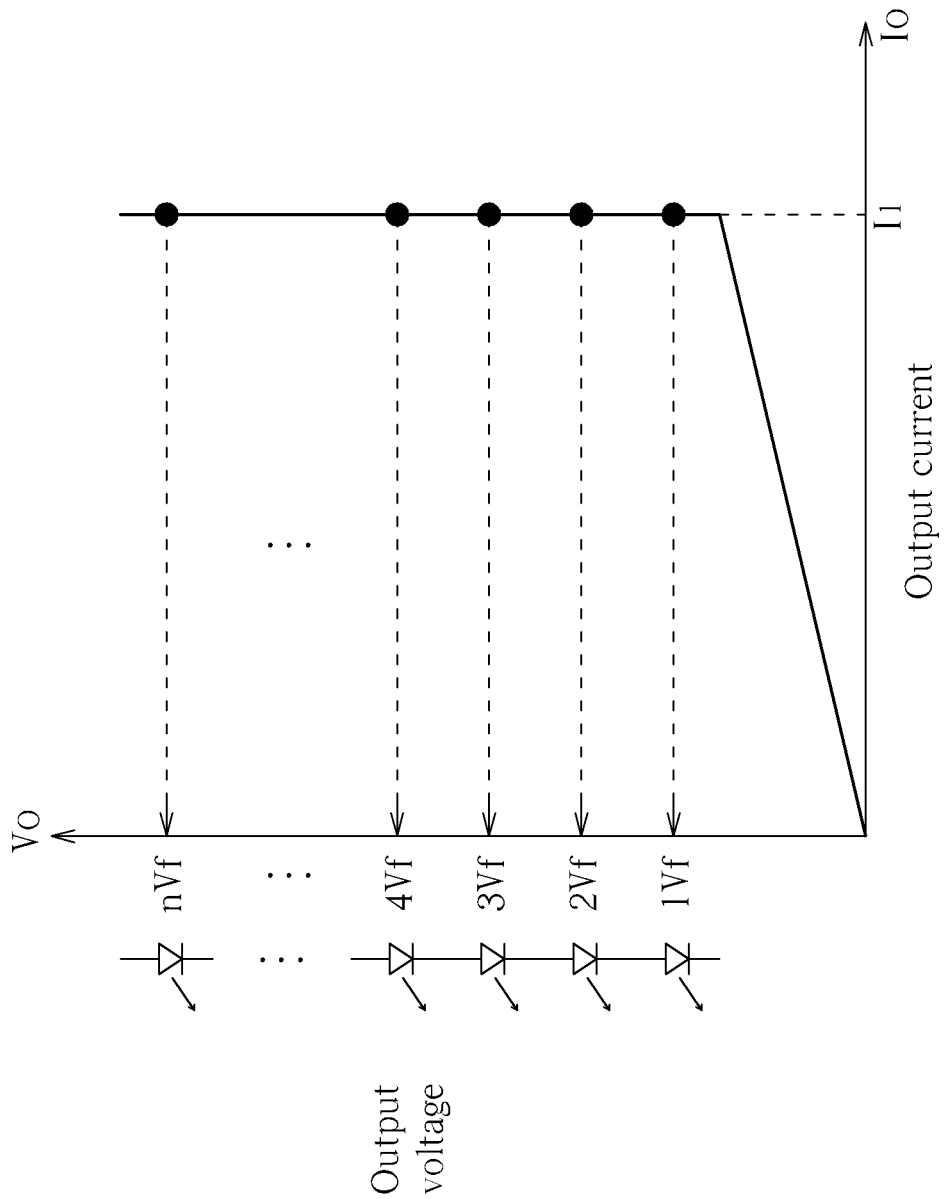
FIG. 7 is a schematic diagram of a V-I plot of an output voltage versus an output current of the power supply shown in FIG. 2.

In short, by periodically setting and resetting the SR flip-flop 506 to turn the power switch Q1 on and off according to the modulation signal $V_{Mod}$, the waveform of the average current $I_{p\_avg}$ of the primary side current $I_P$ can follow the waveform of the DC input voltage $V_i$, making $I_P$ and $V_i$ to be in phase, thus achieving a high power factor to increase power efficiency, as shown in FIG. 6A, which is a schematic diagram of waveforms of the power supply 20. In FIG. 6A, the inductor current rises during a voltage high level of the modulation signal $V_{Mod}$ until a peak inductor current determined by the voltage product $V_m$ is reached, when the power switch Q1 is turned off and the inductor current drops. A zero current triggers the power switch Q1 to turn on again, resulting in an average input current $I_{p\_avg}$ with a waveform that is in phase with $V_m$, and hence the input voltage $V_i$, to achieve high power factor. The control unit 210 also allows the power supply 20 to provide a constant output current and output voltage by turning off the power switch Q1 when the first current signal $I_i$, corresponding to the output current $I_o$, or the second current signal $I_v$, corresponding to the output voltage $V_o$, is too high. Thus, the power supply 20 may be used for various constant current applications, e.g. LED lighting, etc., with over-voltage protection that can provide different output power to different loads. Please refer to FIG. 7, which is a schematic diagram of a V-I plot of the output voltage $V_o$ versus the output current $I_o$ of the power supply 20 according to an embodiment of the present invention. When the output voltage $V_o$ falls between the voltage Vf and 0, the output current $I_o$ decreases. When the output voltage $V_o$ falls between the voltage Vf and nVf, the output current $I_o$ is clamped to a constant current I1. For example, the voltage Vf may be a tolerable output voltage $V_o$ for a single LED of a LED driving power supply, and the voltage nVf is an output voltage of n LEDs connected in serial. When the output voltage $V_o$ exceeds the voltage Vf, the output current $I_o$ of the power supply is clamped to a constant current I1. This can prevent the power supply from outputting too much power and damaging the internal or external circuitry.

Therefore, when the output voltage $V_o$ exceeds the tolerable voltage, the power supply 20 can provide the constant output current $I_{oMax}$ or constant current elements, and thereby avoid damage to the power supply 20 due to over output current. Briefly, the constant current block obtains the selected voltage $V_X$ proportional to the output current $I_o$ via the waveform detection unit 302 and the calculation unit 304, and limits the selected voltage $V_X$ to the reference voltage $V_{ref4}$. As a result, the maximum output current $I_{oMax}$ is limited to a constant and can be applied to constant current elements.

In summary, the present invention achieves high power factor for the power supply, while maintaining a low cost by using primary side feedback control to eliminate the need of using expensive components such as photocouplers for power supply isolation. Also, the present invention provides output regulation through the constant current block and constant voltage block, which can be implemented without complicated circuits (e.g. integrators) or expensive components (e.g. shunt voltage regulators). Furthermore, according to the present invention, power factor correction (PFC), pulse width modulation (PWM) and power regulation control may be built into a single IC chip, allowing smaller circuit area, less power dissipation and lower production costs.

Those skilled in the art will readily observe that numerous modifications and alterations of the device and method may be made while retaining the teachings of the invention.

What is claimed is:

1. A controller for a power supply having a primary side and a secondary side, the controller comprising:
    a mapping circuit, coupled to the primary side, for generating a feedback signal corresponding to variations of an output current of the secondary side;
    a power switch, comprising a first terminal coupled to the primary side, a second terminal and a third terminal, for conducting a connection between the first terminal and the third terminal according to a modulation signal received by the second terminal, and generating a current sense signal at the third terminal;
    a constant current block, for generating a first current signal according to the feedback signal and the current sense signal; and
    a control unit, for generating the modulation signal to control the power switch according to the first current signal, the feedback signal, the current sense signal and a voltage signal from the power supply.

2. The controller of claim 1, wherein the mapping circuit comprises:
    a feedback node, coupled to the constant current block, for generating the feedback signal;
    an auxiliary winding, coupled between the feedback node and a grounding terminal;
    a diode, having a first terminal coupled to the feedback node, and a second terminal;
    a resistor, coupled between the second terminal of the diode and the primary side of the power supply; and
    a capacitor, coupled between the second terminal of the diode and the grounding terminal.

3. The controller of claim 1, wherein the power switch is an n-type metal oxide semiconductor field effect transistor, the first terminal is a drain terminal, the second terminal is a gate terminal, and the third terminal is a source terminal.

4. The controller of claim 1, wherein the constant current block comprises:
    a waveform detection unit, for detecting a waveform of the current sense signal and generating a captured signal;
    a calculation unit, for generating a selected voltage according to the captured signal and the feedback signal, comprising:
        a time factor unit for detecting a discharge time of the feedback signal according to the feedback signal and generating a time factor; and
        a voltage selection unit coupled to the time factor unit and the waveform detection unit, for dividing the captured signal according to the time factor to generate the selected voltage; and
    an error amplifier, coupled to the calculation unit, for limiting a maximum value of the selected voltage to a fourth reference voltage, and generating a first comparison signal according to the selected voltage and the fourth reference voltage from an output terminal;

a comparator unit, for generating the first current signal according to the first comparison signal and a first reference voltage.

5. The controller of claim 4, wherein the comparator unit comprises:
a voltage storage unit, comprising a resistor and a capacitor coupled serially between the output terminal of the error amplifier and a grounding terminal, for storing the first comparison signal;
a voltage storage unit, comprising a resistor and a capacitor coupled serially between the output terminal of the error amplifier and a grounding terminal, for storing the first comparison signal;
a comparator, comprising a first positive input terminal coupled to the voltage storage unit and, a second positive input terminal coupled to the first reference voltage, a negative input terminal coupled to a first node and an output terminal;
a load, disposed between the first node and the grounding terminal;
a current source, for generating the first current signal according to a conduction of a first switch; and
a first switch, for conducting or turning off a connection between the current source and the first node according to signals of the output terminal of the comparator.

6. The controller of claim 5, wherein the comparator outputs a high-level voltage via the output terminal to the first switch when a voltage of the first positive input terminal or the second positive input terminal is greater than that of the negative input terminal, such that the first switch conducts the connection between the current source and the first node.

7. The controller of claim 6, wherein the comparator outputs a low-level voltage via the output terminal to the first switch when a voltage of the first positive input terminal or the second positive input terminal is smaller than that of the negative input terminal, such that the first switch turns off the connection between the current source and the first node.

8. The controller of claim 7, wherein the current source generates the first current signal when the first switch conducts the connection between the current source and the first node.

9. The controller of claim 1, wherein the control unit comprises:
a setting unit, for generating a set signal;
a resetting unit, for generating a reset signal; and
a set/reset (SR) flip-flop, comprising a set terminal coupled to the setting unit, a reset terminal coupled to the resetting unit and an output terminal, for generating the modulating signal according to the set signal and the reset signal.

10. The controller of claim 9, wherein the resetting unit comprises:
a current summing unit, for summing the first current signal and a second current signal and generating a current sum;
an input voltage unit, for generating an inverted voltage signal according to the current sum;
an error amplifier, for generating a comparison signal according to a first reference voltage and the inverted voltage signal;
a multiplier, for multiplying the comparison signal and the voltage signal from the power supply and generating a voltage product; and
a comparator, coupled to the reset terminal of the SR flip-flop, for comparing the voltage product and the current sense signal and generating the reset signal.

11. The controller of claim 9, wherein the setting unit comprises:
a zero current detector, for detecting a zero current in the feedback signal and generating the set signal.

12. The controller of claim 1, further comprising a constant voltage block, for generating a second current signal according to a knee voltage of the feedback signal, comprising:
a peak detector, for generating a peak voltage signal according to a knee voltage of the feedback signal, comprising:
a voltage tracking unit for tracking the feedback signal to output a first voltage signal and outputting a first control signal; and
a sample-and-hold unit coupled to the voltage tracking unit, for sampling the first voltage signal to generate the peak voltage signal;
an error amplifier, coupled to the sample-and-hold unit, for limiting a maximum value of the peak voltage signal to a third reference voltage and generating a second comparison signal according to the peak voltage signal and the third reference signal from an output terminal; and
a comparator unit for generating the second current signal according to the second comparison signal and a first reference voltage.

13. The controller of claim 12, wherein the comparator unit comprises:
a voltage storage unit, comprising a resistor and a capacitor coupled serially between the output terminal of the error amplifier and a grounding terminal, for storing the second comparison signal;
a comparator, comprising a first positive input terminal coupled to the voltage storage unit and, a second positive input terminal coupled to the first reference voltage, a negative input terminal coupled to a second node and an output terminal;
a load, disposed between the second node and the grounding terminal;
a current source, for generating the second current signal according to a conduction of a second switch; and
a second switch, for conducting or turning off a connection between the current source and the first node according to signals of the output terminal of the comparator.

14. The controller of claim 13, wherein the comparator outputs a high-level voltage via the output terminal to the second switch when a voltage of the first positive input terminal or the second positive input terminal is greater than that of the negative input terminal, such that the second switch conducts the connection between the current source and the second node.

15. The controller of claim 14, wherein the comparator outputs a low-level voltage via the output terminal to the second switch when a voltage of the first positive input terminal or the second positive input terminal is smaller than that of the negative input terminal, such that the second switch turns off the connection between the current source and the second node.

16. The controller of claim 15, wherein the current source generates the second current signal when the second switch conducts the connection between the current source and the second node.

17. The controller of claim 1, wherein the voltage signal is proportional to a rectified input voltage of the power supply.

18. A power supply comprising:
a transformer comprising:
a primary side winding for providing a primary side current; and a secondary side winding for providing a secondary side current for the output current, wherein a ratio between the secondary current and the primary current is a constant; and a controller for the power supply, comprising:
a mapping circuit, coupled to the primary side, for generating a feedback signal corresponding to variations of an output current of the secondary side;
a power switch, comprising a first terminal coupled to the primary side, a second terminal and a third terminal, for conducting a connection between the first terminal and the third terminal according to a modulation signal received by the second terminal, and generating a current sense signal at the third terminal;
a constant current block, for generating a first current signal according to the feedback signal and the current sense signal; and
a control unit, for generating the modulation signal to control the power switch according to the first current signal, the feedback signal, the current sense signal and a voltage signal from the power supply.

19. The power supply of claim 18, wherein the mapping circuit comprises:
a feedback node, coupled to the constant current block, for generating the feedback signal;
an auxiliary winding, coupled between the feedback node and a grounding terminal;
a diode, having a first terminal coupled to the feedback node, and a second terminal;
a resistor, coupled between the second terminal of the diode and the primary side of the power supply; and
a capacitor, coupled between the second terminal of the diode and the grounding terminal.

20. The power supply of claim 18, wherein the comparator unit comprises:
a comparison unit, comprising a resistor and a capacitor;
a comparator, with a first positive input terminal coupled to the comparison unit, a second positive input terminal coupled to the first reference voltage, a negative input terminal coupled to a first node and an output terminal;
a voltage source, for generating the first current signal;
a load, disposed between the first node and a ground; and
a switch, coupled to the first node, for switching between the output terminal of the comparator and the voltage source.

21. The power supply of claim 18, wherein the constant current block comprises:
a waveform detection unit, for detecting a waveform of the current sense signal and generating a captured signal;
a calculation unit, for generating a selected voltage according to the captured signal and the feedback signal, comprising:
a time factor unit for detecting a discharge time of the feedback signal according to the feedback signal and generating a time factor; and
a voltage selection unit coupled to the time factor unit and the waveform detection unit, for dividing the captured signal according to the time factor to generate the selected voltage; and
an error amplifier, coupled to the calculation unit, for limiting a maximum value of the selected voltage to a fourth reference voltage, and generating a first comparison signal according to the selected voltage and the fourth reference voltage from an output terminal;
a comparator unit, for generating the first current signal according to the first comparison signal and a first reference voltage.

22. The power supply of claim 21, wherein the comparator unit comprises:
a voltage storage unit, comprising a resistor and a capacitor coupled serially between the output terminal of the error amplifier and a grounding terminal, for storing the first comparison signal;
a comparator, comprising a first positive input terminal coupled to the voltage storage unit and, a second positive input terminal coupled to the first reference voltage, a negative input terminal coupled to a first node and an output terminal;
a load, disposed between the first node and the grounding terminal;
a current source, for generating the first current signal according to a conduction of a first switch; and
a first switch, for conducting or turning off a connection between the current source and the first node according to signals of the output terminal of the comparator.

23. The power supply of claim 22, wherein the comparator outputs a high-level voltage via the output terminal to the first switch when a voltage of the first positive input terminal or the second positive input terminal is greater than that of the negative input terminal, such that the first switch conducts the connection between the current source and the first node.

24. The power supply of claim 23, wherein the comparator outputs a low-level voltage via the output terminal to the first switch when a voltage of the first positive input terminal or the second positive input terminal is smaller than that of the negative input terminal, such that the first switch turns off the connection between the current source and the first node.

25. The power supply of claim 24, wherein the current source generates the first current signal when the first switch conducts the connection between the current source and the first node.

26. The power supply of claim 18, wherein the control unit comprises:
a setting unit, for generating a set signal;
a resetting unit, for generating a reset signal; and
a set/reset (SR) flip-flop, comprising a set terminal coupled to the setting unit, a reset terminal coupled to the resetting unit and an output terminal, for generating the modulating signal according to the set signal and the reset signal.

27. The power supply of claim 26, wherein the resetting unit comprises:
a current summing unit, for summing the first current signal and a second current signal and generating a current sum;
an input voltage unit, for generating an inverted voltage signal according to the current sum;
an error amplifier, for generating a comparison signal according to a first reference voltage and the inverted voltage signal;
a multiplier, for multiplying the comparison signal and the voltage signal from the power supply and generating a voltage product; and
a comparator, coupled to the reset terminal of the SR flip-flop, for comparing the voltage product and the current sense signal and generating the reset signal.

28. The power supply of claim 26, wherein the setting unit comprises:
a zero current detector, for detecting a zero current in the feedback signal and generating the set signal.

29. The power supply of claim 18, further comprising a constant voltage block, for generating a second current signal according to a knee voltage of the feedback signal, comprising:

a peak detector, for generating a peak voltage signal according to a knee voltage of the feedback signal, comprising:
- a voltage tracking unit for tracking the feedback signal to output a first voltage signal and outputting a first control signal; and
- a sample-and-hold unit coupled to the voltage tracking unit, for sampling the first voltage signal to generate the peak voltage signal;

an error amplifier, coupled to the sample-and-hold unit, for limiting a maximum value of the peak voltage signal to a third reference voltage and generating a second comparison signal according to the peak voltage signal and the third reference signal from an output terminal; and a comparator unit for generating the second current signal according to the second comparison signal and a first reference voltage.

30. The power supply of claim 29, wherein the comparator unit comprises:
- a voltage storage unit, comprising a resistor and a capacitor coupled serially between the output terminal of the error amplifier and a grounding terminal, for storing the second comparison signal;
- a comparator, comprising a first positive input terminal coupled to the voltage storage unit and, a second positive input terminal coupled to the first reference voltage, a negative input terminal coupled to a second node and an output terminal;
- a load, disposed between the second node and the grounding terminal;
- a current source, for generating the second current signal according to a conduction of a second switch; and
- a second switch, for conducting or turning off a connection between the current source and the first node according to signals of the output terminal of the comparator.

31. The power supply of claim 30, wherein the comparator outputs a high-level voltage via the output terminal to the second switch when a voltage of the first positive input terminal or the second positive input terminal is greater than that of the negative input terminal, such that the second switch conducts the connection between the current source and the second node.

32. The power supply of claim 31, wherein the comparator outputs a low-level voltage via the output terminal to the second switch when a voltage of the first positive input terminal or the second positive input terminal is smaller than that of the negative input terminal, such that the second switch turns off the connection between the current source and the second node.

33. The power supply of claim 32, wherein the current source generates the second current signal when the second switch conducts the connection between the current source and the second node.

34. The power supply of claim 18, wherein the voltage signal is proportional to a rectified input voltage of the power supply.

* * * * *